G. F. MESSLER.
LIMB SUPPORT.
APPLICATION FILED DEC. 1, 1909.
992,514.
Patented May 16, 1911.
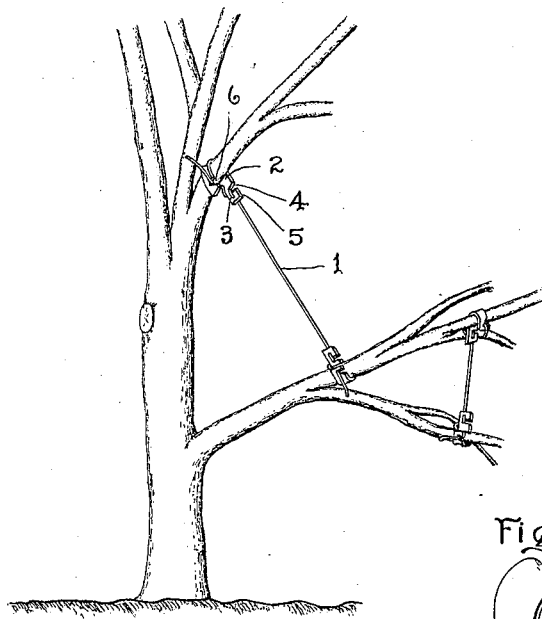
Fig. 1.
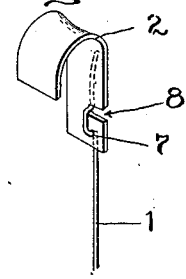
Fig. 3.
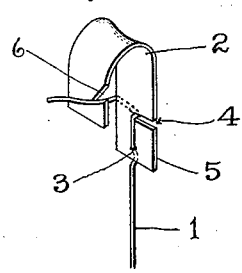
Fig. 2.
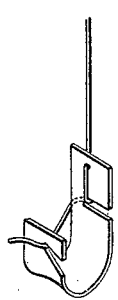
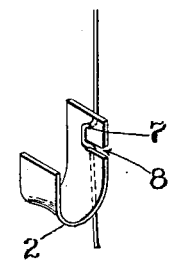
Witnesses:—
Lester H. Fulmer.
Louis W. Gray.
Inventor:—
George F. Messler.
by Townsend  & Hackley
his Attys.

UNITED STATES PATENT OFFICE.

GEORGE F. MESSLER, OF FULLERTON, CALIFORNIA.

LIMB-SUPPORT.

992,514.  Specification of Letters Patent.  Patented May 16, 1911.

Application filed December 1, 1909. Serial No. 530,880.

*To all whom it may concern:*

Be it known that I, GEORGE F. MESSLER, a citizen of the United States, residing at Fullerton, in the county of Orange and State of California, have invented a new and useful Limb-Support, of which the following is a specification.

This invention relates to tree supports designed for supporting the limbs of orange trees, lemon trees or walnut trees, and the main objects of the invention are to dispense entirely with poles and provide a tree support which is self-contained within the tree, one end of the support being connected to the limb to be supported and the other end being connected to another limb or to the trunk of the tree.

The support acts in the capacity of resisting tensile strain and, therefore, the supporting connection may consist of wire, thereby effecting an enormous economy over the use of props in the form of poles which support the limbs by resisting compression strains and which in consequence thereof are necessarily of considerable length and size. In addition to the advantage of this enormous economy in construction, a further advantage resides in the fact that the space between the ground and the lower branches of the tree is perfectly free permitting unobstructed passage thereunder.

A further object of the invention is to provide for adjusting the length of the support.

My invention briefly consists of a connection and means at each end of said connection for engaging with a limb or other part of the tree.

Referring to the drawings: Figure 1 is a side elevation of a part of a tree showing the manner of applying the supports. Fig. 2 is a perspective view of a limb support embodying my invention. Fig. 3 is a perspective view illustrating a modified form of my device.

In the form shown in Figs. 1 and 2, 1 designates the connection which is formed of wire which is secured at each end to a hook 2, each hook 2 being formed of sheet metal, as shown, the curved portion of which presents an internally convex surface which bears against the limb of the tree and holds the edges of the hook away therefrom, so that the limb is not bruised or scraped. It also permits the hook to rock slightly and conform naturally to the line of strain according to the direction of the wire 1.

The wire 1 is secured to the hook 2 by passing the wire up behind the hook, thence inwardly through the orifice or perforation 3, thence up and out through a transverse narrow slot 4 extending in and from the edge of the hook at right angles thereto, and then lies against the back of the elongated portion 5 of the hook, as indicated. The end of the wire is then passed around the portion 5 of the hook, thence under the bough of the tree to which the hook is attached, thence through a notch 6 in the outer or free end of the hook. The two kinks formed in the wire in passing through the perforation 3 and over the edge of the slot 4 are ample to prevent the wire from slipping and to hold the hook firmly in place, but in addition to this the wire is passed over the open end of the hook and through the notch in the free end of the hook where another kink in the wire is made by bending the wire back against the face of the hook. The wire when thus engaged extends over the opening between the ends of the hook and thus completely incloses the limb.

In the form shown in Fig. 3, the notch in the short end of the hook is omitted and the wire 1 is secured to the hook 2 by passing the end of the wire through a perforation 7, thence through a slot 8, after which the end of the hook is bent flat against the back of the hook. In both forms of hook the free end of the hook is shorter than the end containing the perforation and transverse slot so that the wire may be readily placed in the slot after being passed through the perforation.

In applying the device to a tree one of the hooks is engaged with the limb to be supported and the other hook is engaged with another limb which is sufficiently stiff to provide the necessary supporting strength. From this it will be apparent that by commencing from a sufficiently rigid part of the tree the supports may be extended from limb to limb throughout the tree so that all of the branches thereof may be perfectly supported.

What I claim is:

1. A limb support comprising a pair of hooks, each hook having a transverse slot adjacent one end thereof and a perforation between the slot and the end, the other end